US012684078B2

(12) United States Patent
Yoshimi

(10) Patent No.: US 12,684,078 B2
(45) Date of Patent: Jul. 14, 2026

(54) IMAGE FORMING APPARATUS, NON-TRANSITORY COMPUTER READABLE MEDIUM, AND METHOD

(71) Applicant: FUJIFILM Business Innovation Corp., Tokyo (JP)

(72) Inventor: Makoto Yoshimi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,797

(22) Filed: Mar. 3, 2023

(65) Prior Publication Data

US 2024/0056538 A1  Feb. 15, 2024

(30) Foreign Application Priority Data

Aug. 15, 2022  (JP) ................................. 2022-129224

(51) Int. Cl.
*H04N 1/00* (2006.01)
*H04N 1/32* (2006.01)

(52) U.S. Cl.
CPC ..... *H04N 1/00824* (2013.01); *H04N 1/00395* (2013.01); *H04N 1/32101* (2013.01)

(58) Field of Classification Search
CPC .......... H04N 1/00824; H04N 1/00395; H04N 1/32101; Y02D 10/00
See application file for complete search history.

(56) References Cited

U.S. PATENT DOCUMENTS

| | | | | | |
|---|---|---|---|---|---|
| 8,988,716 | B1* | 3/2015 | Odean | ................... | G06F 3/1222 |
| | | | | | 358/1.14 |
| 11,032,436 | B2 | 6/2021 | Horie et al. | | |
| 2016/0044199 | A1* | 2/2016 | Nago | ................. | H04N 1/00411 |
| | | | | | 358/1.15 |
| 2016/0267282 | A1* | 9/2016 | Dalaa | ....................... | G06F 21/31 |
| 2018/0075442 | A1* | 3/2018 | Tyler | ................. | G06Q 20/3276 |
| 2020/0336609 | A1* | 10/2020 | Horie | ................... | G06F 3/1275 |
| 2023/0120274 | A1* | 4/2023 | Nagao | ............... | H04N 1/32096 |
| | | | | | 358/1.15 |

FOREIGN PATENT DOCUMENTS

| | | |
|---|---|---|
| JP | 2016-213098 A | 12/2016 |
| JP | 2017-111799 A | 6/2017 |
| JP | 2019-126918 A | 8/2019 |
| JP | 2020-177590 A | 10/2020 |

* cited by examiner

*Primary Examiner* — Iriana Cruz
(74) *Attorney, Agent, or Firm* — Oliff PLC

(57) ABSTRACT

An image forming apparatus includes a processor configured to: set, if a state of waiting for a result of processing from an external apparatus is established in a case where the processor executes a processing request for which the processor needs to request an external apparatus to perform the processing and receive the result of the processing from the external apparatus, identification information for identifying the processing request and establish a state where the processor can execute another processing request from another user; and output, in a case where the set identification information is input, the result of the processing for the processing request identified with the input identification information.

7 Claims, 20 Drawing Sheets

40

SCANNING TRANSLATION

JOB EXECUTION STATE: TRANSMITTING

5/30 TRANSMITTED (5 MINUTES TO COMPLETE TRANSMISSION)

CANCEL

TRANSMISSION COMPLETED

40

SCANNING TRANSLATION

JOB EXECUTION STATE: TRANSLATING

2/30 TRANSLATED (28 MINUTES TO COMPLETE TRANSLATION)

41 — WAIT    CANCEL (3) OCR
(4) TRANSLATION (5) TRANSMIT RESULT OF TRANSLATION

20

30

INTERNET (2) TRANSMIT SCANNED DOCUMENT

24

CONVENIENCE STORE

10

USER (1) SCAN DOCUMENT
(6) RECEIVE AND PRINT RESULT OF TRANSLATION

FIG. 4

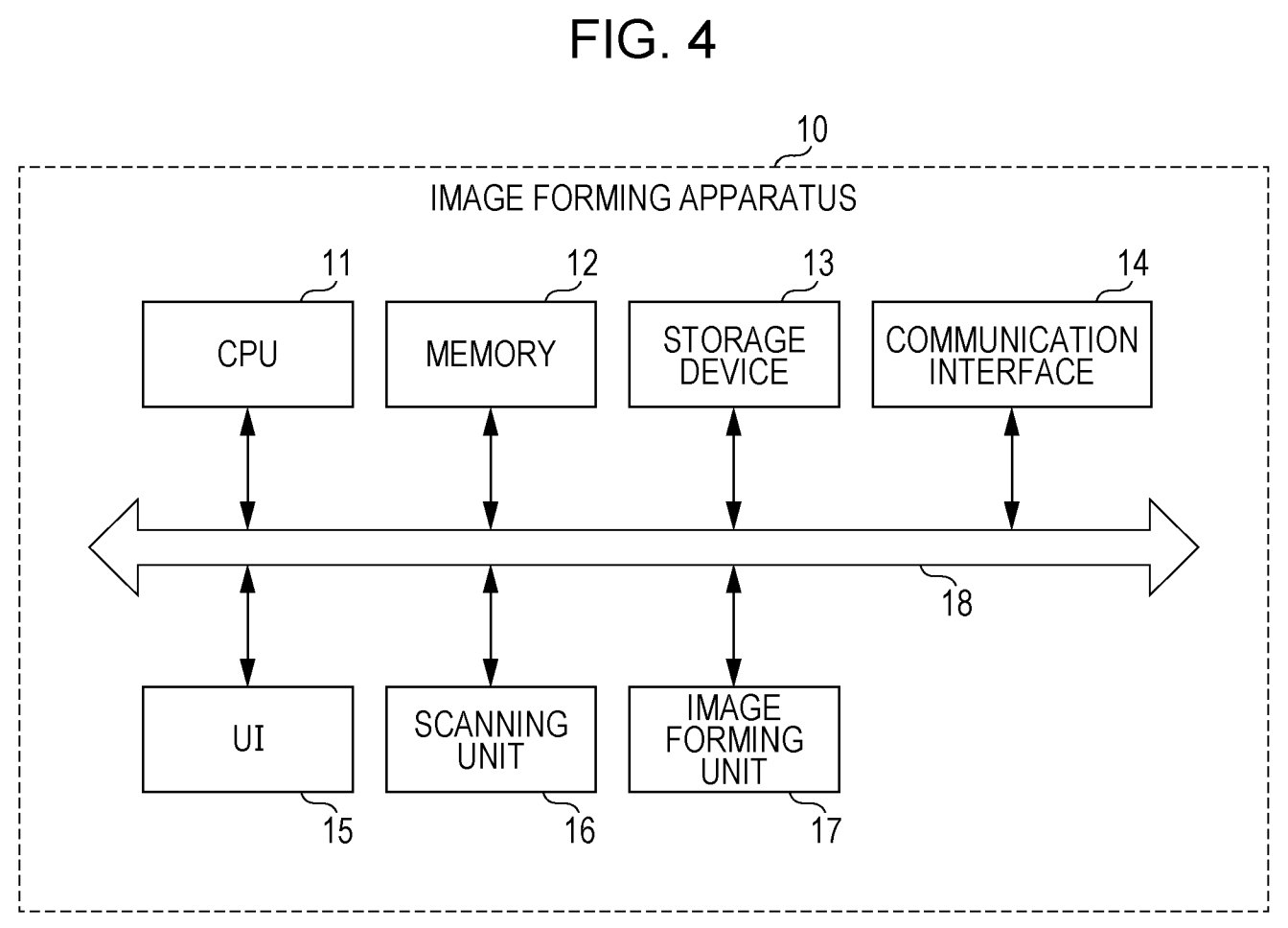

IMAGE FORMING APPARATUS

10

11 CPU

12 MEMORY

13 STORAGE DEVICE

14 COMMUNICATION INTERFACE

15 UI

16 SCANNING UNIT

17 IMAGE FORMING UNIT

18

START

MONITOR PROGRESS OF JOB
IN IMAGE FORMING APPARATUS 10 AND
CLOUD SERVER 20 — S101

WAITING FOR
RESULT OF PROCESSING
FROM CLOUD
SERVER 20? — S102 no yes

DISPLAY WAIT BUTTON ON OPERATION PANEL — S103

HAS USER USED
WAIT BUTTON? — S104 no yes

SET IDENTIFICATION INFORMATION FOR
IDENTIFYING JOB THAT IS BEING EXECUTED — S105

ESTABLISH USER WAITING STATE FOR
JOB THAT IS BEING EXECUTED — S106

END

SCANNING TRANSLATION

YOU ARE GOING TO WAIT TO RECEIVE RESULT OF JOB.

INPUT KEYWORD FOR
RECEIVING RESULT.

* * * *

REGISTER

Figure 10:
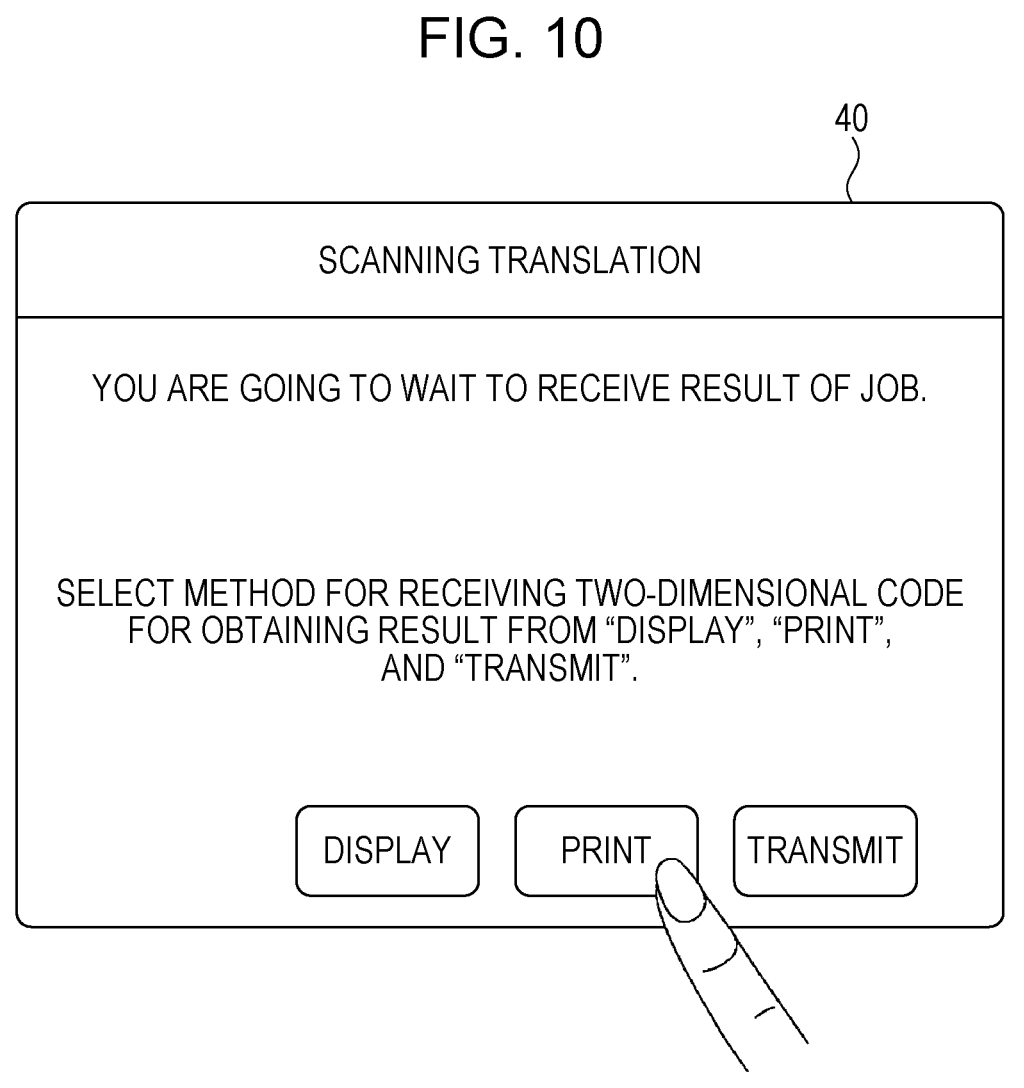

SCANNING TRANSLATION

YOU ARE GOING TO WAIT TO RECEIVE RESULT OF JOB.

SELECT METHOD FOR RECEIVING TWO-DIMENSIONAL CODE
FOR OBTAINING RESULT FROM "DISPLAY", "PRINT",
AND "TRANSMIT".

DISPLAY        PRINT        TRANSMIT

JOB ID: A%##48DCV258C
ISSUE TIME: MARCH 14, 2022   18:52:34

READ ABOVE TWO-DIMENSIONAL CODE WITH
MULTIFUNCTION DEVICE TO OBTAIN RESULT OF JOB.

FIG. 13

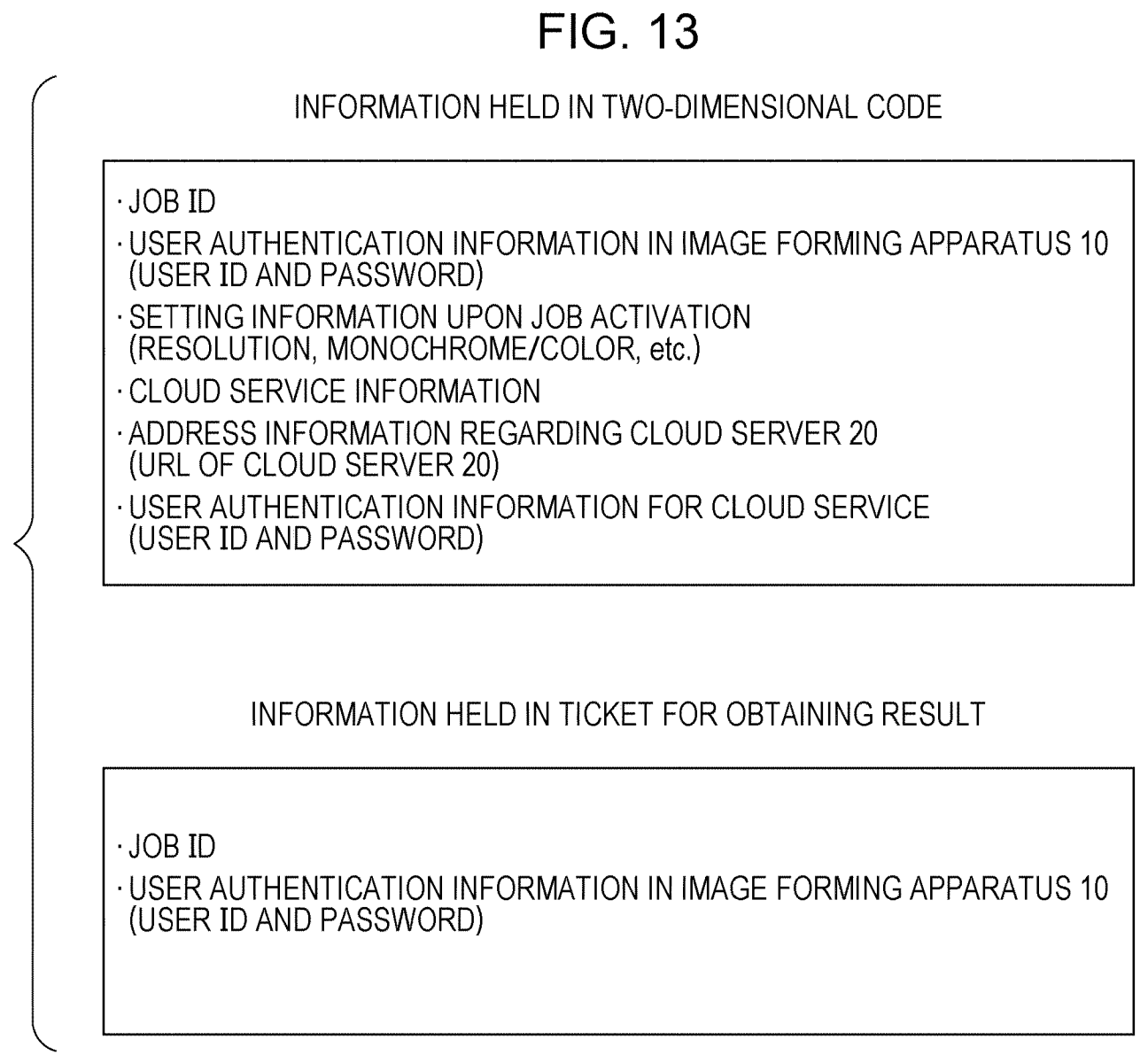

INFORMATION HELD IN TWO-DIMENSIONAL CODE

· JOB ID
· USER AUTHENTICATION INFORMATION IN IMAGE FORMING APPARATUS 10 (USER ID AND PASSWORD)
· SETTING INFORMATION UPON JOB ACTIVATION (RESOLUTION, MONOCHROME/COLOR, etc.)
· CLOUD SERVICE INFORMATION
· ADDRESS INFORMATION REGARDING CLOUD SERVER 20 (URL OF CLOUD SERVER 20)
· USER AUTHENTICATION INFORMATION FOR CLOUD SERVICE (USER ID AND PASSWORD)

INFORMATION HELD IN TICKET FOR OBTAINING RESULT

· JOB ID
· USER AUTHENTICATION INFORMATION IN IMAGE FORMING APPARATUS 10 (USER ID AND PASSWORD)

Figures 17, 18:
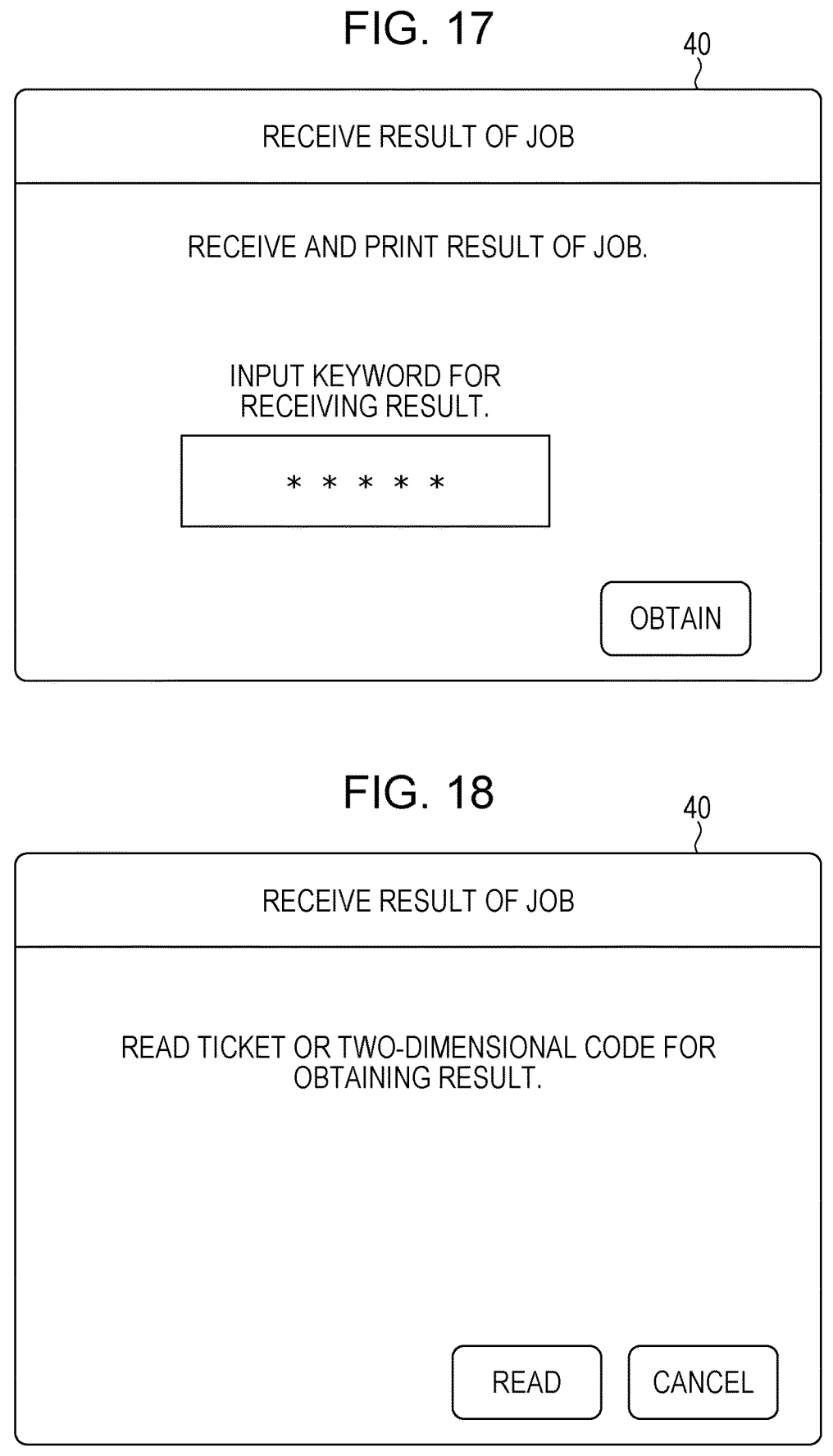

RECEIVE RESULT OF JOB

RECEIVE AND PRINT RESULT OF JOB.

INPUT KEYWORD FOR
RECEIVING RESULT.

* * * * *

OBTAIN

RECEIVE RESULT OF JOB

READ TICKET OR TWO-DIMENSIONAL CODE FOR
OBTAINING RESULT.

READ     CANCEL

FIG. 21

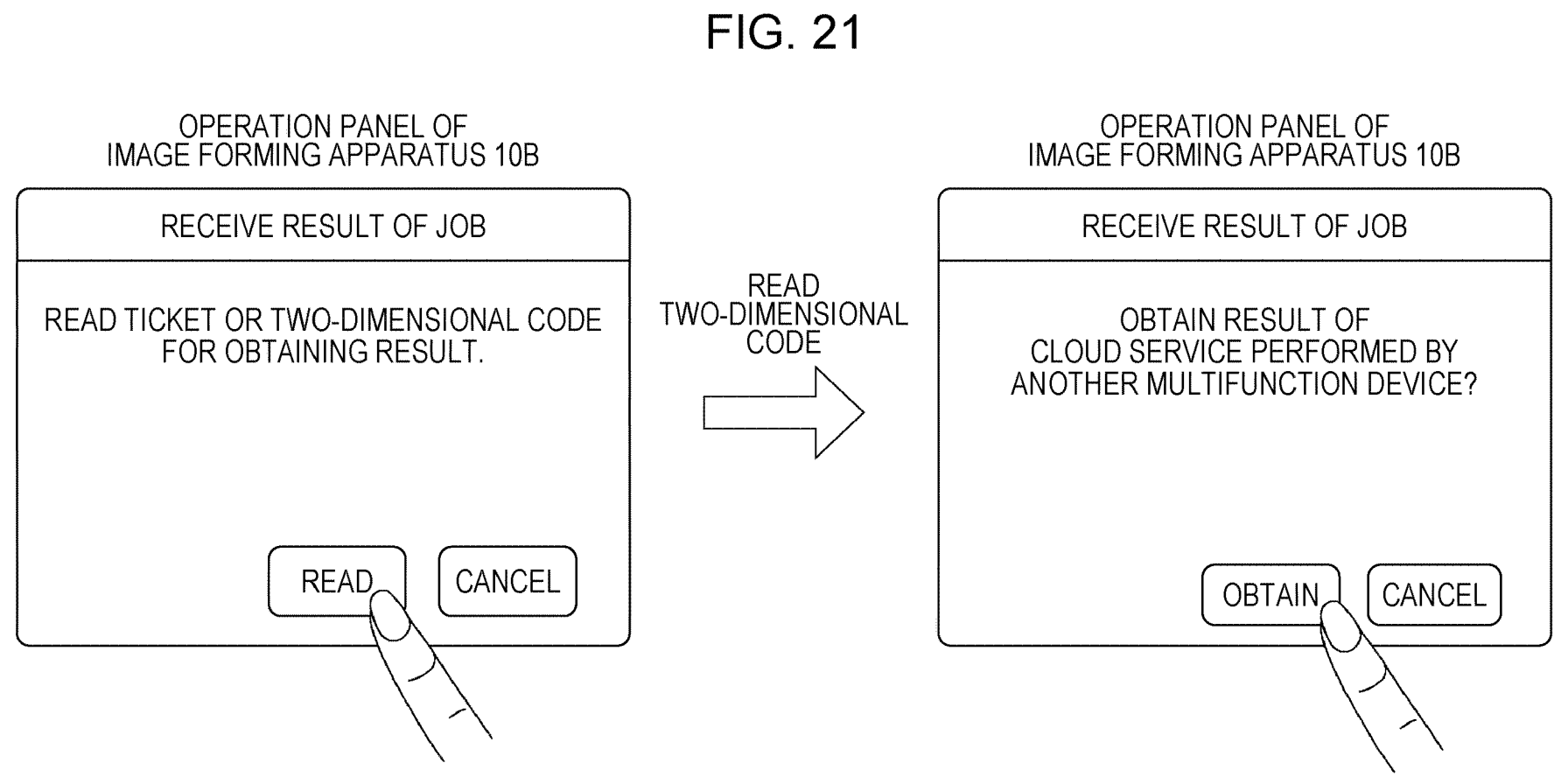

OPERATION PANEL OF
IMAGE FORMING APPARATUS 10B

RECEIVE RESULT OF JOB

READ TICKET OR TWO-DIMENSIONAL CODE
FOR OBTAINING RESULT.

READ      CANCEL

READ
TWO-DIMENSIONAL
CODE
→

OPERATION PANEL OF
IMAGE FORMING APPARATUS 10B

RECEIVE RESULT OF JOB

OBTAIN RESULT OF
CLOUD SERVICE PERFORMED BY
ANOTHER MULTIFUNCTION DEVICE?

OBTAIN      CANCEL

IMAGE FORMING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-129224 filed Aug. 15, 2022.

BACKGROUND

(i) Technical Field

The present disclosure relates to an image forming apparatus, a non-transitory computer readable medium, and a method.

(ii) Related Art

Japanese Unexamined Patent Application Publication No. 2017-111799 discloses a service provision system that receives a notification indicating that an external printing system has created a print job, that obtains the print job, that stores the print job in storage means, and that transmits the print job stored in the storage means in response to a request from an image forming apparatus connected thereto over a network.

Japanese Unexamined Patent Application Publication No. 2019-126918 discloses an image forming apparatus that, if an instruction to start a job is given and a user other than a login user is detected, asks, on a determination screen, the login user to determine whether to execute or reserve the job, that executes the job if the login user determines that the job is to be executed or reserves the job if the login user determines that the job is to be reserved, and that logs out the login user.

Japanese Unexamined Patent Application Publication No. 2020-177590 discloses an information processing apparatus capable of, in a case where the information processing apparatus receives a job including transfer of data to the outside and executes the job, starting a second job that uses the same transfer protocol as a first job, which has been received earlier, before the first job ends.

SUMMARY

A cloud service is provided where, for example, an image forming apparatus installed in a convenience store scans a document and transmits obtained document data to an external apparatus such as a cloud server and the cloud server performs translation. Because a user who uses the cloud service does not know when the translation ends and the image forming apparatus prints a result of the translation, the user needs to stay in front of the image forming apparatus while the cloud server is performing the translation. Since the user occupies the image forming apparatus during the time, it is difficult for the image forming apparatus to receive and execute a processing request from another user, which decreases processing efficiency and might form a line of people waiting to use the image forming apparatus.

Aspects of non-limiting embodiments of the present disclosure relate to provision of an image forming apparatus, a non-transitory computer readable medium, and a method capable of, in a case where a processing request for which an external apparatus needs to be requested to perform processing and a result of the processing needs to be received from the external apparatus is executed, executing another processing request from another user, even while the processing request is being executed and has not been completed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to: set, if a state of waiting for a result of processing from an external apparatus is established in a case where the processor executes a processing request for which the processor needs to request an external apparatus to perform the processing and receive the result of the processing from the external apparatus, identification information for identifying the processing request and establish a state where the processor can execute another processing request from another user; and output, in a case where the set identification information is input, the result of the processing for the processing request identified with the input identification information.

BRIEF DESCRIPTION OF THE DRAWINGS

An exemplary embodiment of the present disclosure will be described in detail based on the following figures, wherein:

FIG. 4 is a block diagram illustrating the hardware configuration of the image forming apparatus according to the exemplary embodiment of the present disclosure;

FIG. 8 is a diagram illustrating an example of a display screen at a time when a character string input by the user is set as a keyword for obtaining a result;

FIG. 10 is a diagram illustrating an example of an operation screen at a time when the user issues a two-dimensional code for obtaining a result;

FIG. 13 is a diagram illustrating an example of information included in identification information when a two-dimensional code or a ticket for obtaining a result including a character string is issued as the identification information;

FIG. 17 is a diagram illustrating an example of an operation screen at a time when an input of a keyword is received from the user;

FIG. 18 is a diagram illustrating an example of an operation screen at a time when the user is asked to read a ticket for obtaining a result or a two-dimensional code with a scanner;

FIG. 21 is a diagram illustrating an example of an operation screen at a time when the other image forming apparatus performs a process for resuming the job for which the user waiting state has been established.

DETAILED DESCRIPTION

Next, an exemplary embodiment of the present disclosure will be described in detail with reference to the drawings.

Figure 1:
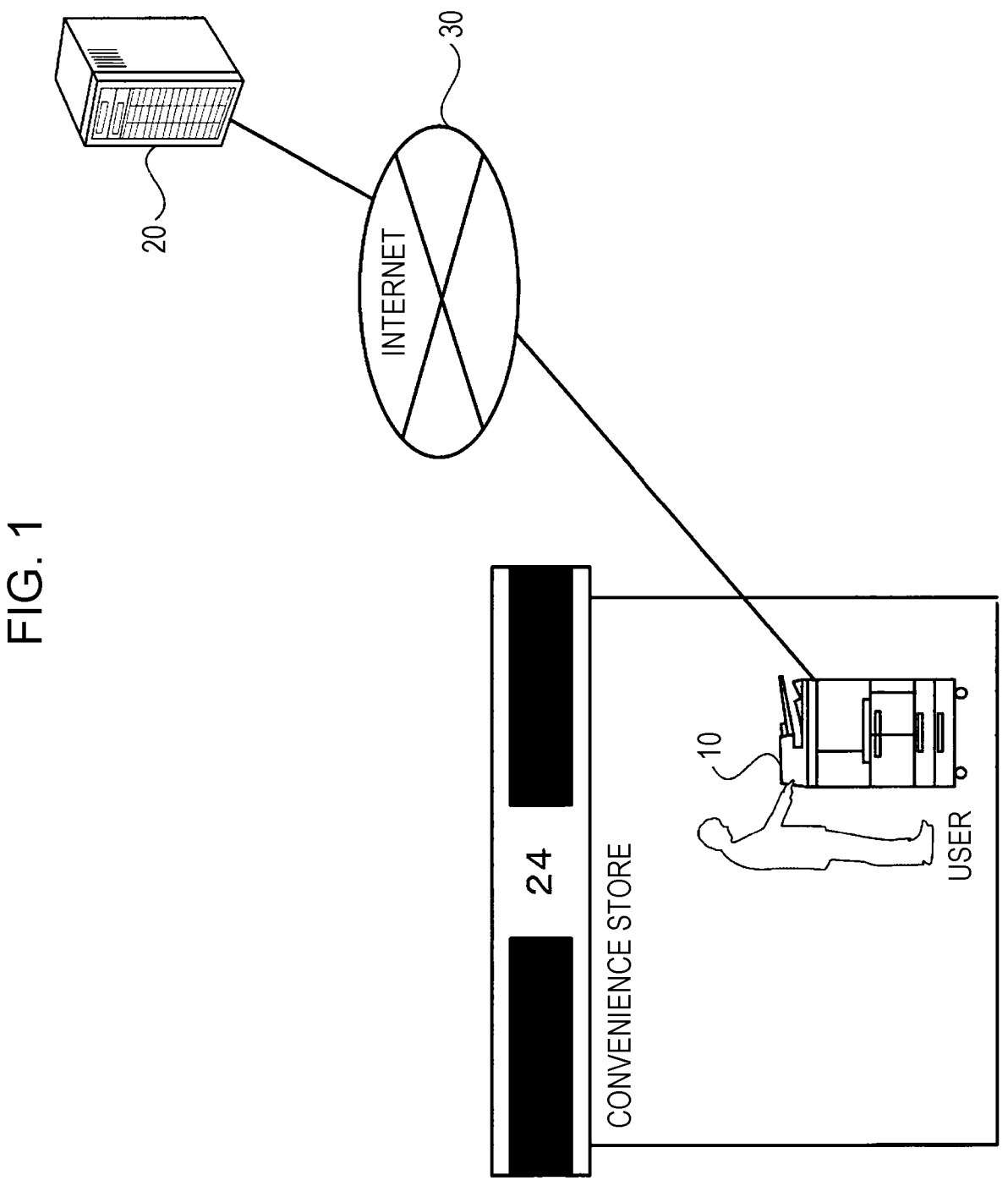
FIG. 1 is a diagram illustrating the system configuration of an image forming system according to the exemplar embodiment of the present disclosure.

FIG. 1 is a diagram illustrating the system configuration of an image forming system according to the exemplary embodiment of the present disclosure.

As illustrated in FIG. 1, the image forming system according to the exemplary embodiment of the present disclosure includes an image forming apparatus 10 and a cloud server 20 connected to each other through the Internet 30. Although FIG. 1 illustrates only one image forming apparatus 10 to simplify description, plural image forming apparatuses 10 are connectable to the cloud server 20 through the Internet 30 in practice. The image forming apparatus 10 is installed in a store, such as a convenience store, visited by a large number of users. The image forming apparatus 10 is a so-called multifunction device, which has functions such as a printing function, a scanning function, a copying function, and a facsimile function and performs processes on the basis of jobs given by users. Here, jobs refer to processing requests given to the image forming apparatus 10 to perform processes.

The image forming apparatus 10 also has a function of providing the users with functions that cannot be achieved by the image forming apparatus 10 alone by cooperating with cloud services provided by the cloud server 20. For example, the image forming apparatus 10 provides a service where the image forming apparatus 10 scans an English document and transfers a read image to the cloud server 20 and the cloud server 20 translates the English document into Japanese through optical character reading (OCR). This kind of service, where a scanned text image is translated using a cloud service, is called "scanning translation".

Figure 2:
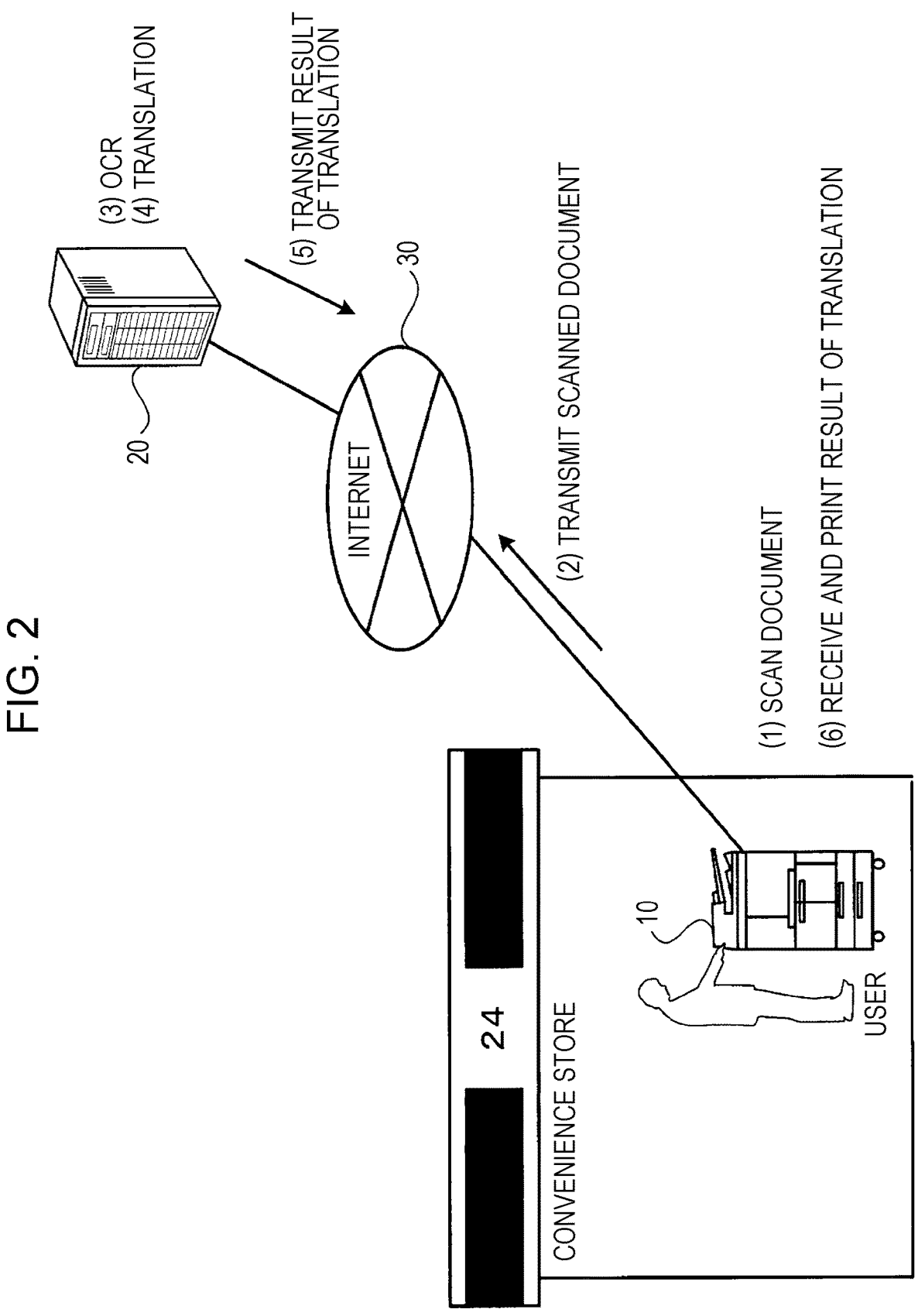
FIG. 2 is a diagram illustrating a process at a time when an image forming apparatus performs scanning translation using a cloud server.

A process when scanning translation is performed using the cloud server 20 will be described with reference to FIG. 2.

(1) In scanning translation, first, a user scans, using the image forming apparatus 10, a document to be translated.

(2) Next, the image forming apparatus 10 transmits the scanned document to the cloud server 20 through the Internet 30.

(3) The cloud server 20 performs OCR on the scanned document to obtain text data.

(4) The cloud server 20 then translates the obtained text data.

(5) The cloud server 20 then transmits a result of the translation to the image forming apparatus 10 through the Internet 30.

(6) Upon receiving the result of the translation from the cloud server 20, the image forming apparatus 10 outputs the received result of the translation by printing the result on sheets of paper.

When the image forming apparatus 10 executes a job for which the image forming apparatus 10 needs to request the cloud server 20, which is an external apparatus, to perform processing and receive a result of the processing from the cloud server 20 in this process, however, the image forming apparatus 10 undesirably enters a state of waiting for the result of the processing from the cloud server 20, if it takes time for the cloud server 20 to complete the processing.

When translation speed of the cloud server 20 is one page per minute, for example, it takes 20 minutes to translate a 20-page document.

When the image forming apparatus 10 enters the state of waiting for a result of processing from the cloud server 20, the image forming apparatus 10 keeps waiting for the cloud server 20 to complete the translation.

Because a job that is being executed might be cancelled if another user uses the image forming apparatus 10 in a state of waiting for a result of processing, a user who has requested the job needs to stay in front of the image forming apparatus 10. In addition, since the use does not know when a result of processing is transmitted from the cloud server 20, another user might obtain the result of processing if the user leaves the image forming apparatus 10.

For these reasons, a user needs to stay in front of the image forming apparatus 10 even after the image forming apparatus 10 enters a state of waiting for a result of processing from the cloud server 20. Other users, however, might think that the user is occupying the image forming apparatus 10 without even using the image forming apparatus 10.

Figure 3:
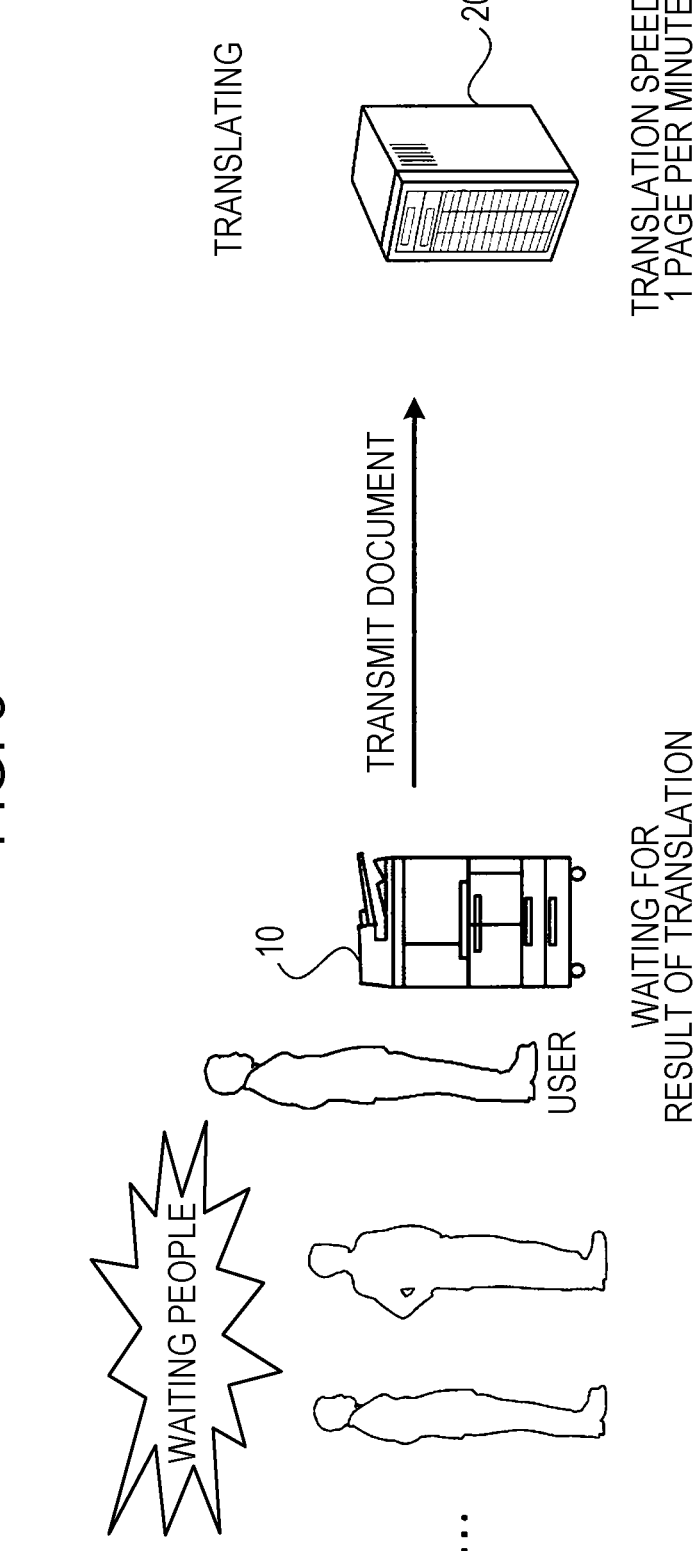
FIG. 3 is a diagram illustrating how a line of people waiting to use the image forming apparatus is formed when the cloud server performs time-consuming translation.

If a user occupies the image forming apparatus 10 for a long time in order for the cloud server 20 to perform time-consuming translation, a line of people waiting to use the image forming apparatus 10 might be formed as illustrated in FIG. 3. Even in this case, the user who is waiting for a job to be completed, however, needs to stay in front of the image forming apparatus 10, which is embarrassing.

Furthermore, since other users cannot use the image forming apparatus 10, processing efficiency decreases.

The image forming apparatus 10 according to the present exemplary embodiment, therefore, performs control in a manner that will be described hereinafter so that in a case where the image forming apparatus 10 executes a processing request, such as a job, for which the image forming apparatus 10 needs to request an external apparatus such as the cloud server 20 to perform processing and receive a result of the processing from the external apparatus, the image forming apparatus 10 can execute another processing request from another user, even while the image forming apparatus 10 has not completed and is executing the foregoing processing request.

FIG. 4 illustrates the hardware configuration of the image forming apparatus 10 in the image forming system according to the present exemplary embodiment.

As illustrated in FIG. 4, the image forming apparatus 10 includes a central processing unit (CPU) 11, a memory 12, a storage device 13 such as a hard disk drive, a communication interface 14 that communicates data with external apparatuses through the Internet 30, a user interface (UI) 15 including a touch panel or a liquid crystal display and a keyboard, a scanning unit 16, and an image forming unit 17. These components are connected to one another through a control bus 18.

The image forming unit 17 prints images on a recording medium such as sheets of paper through steps such as charging, exposure, development, transfer, and fixing.

The CPU 11 is a processor that controls the operation of the image forming apparatus 10 by performing a certain process on the basis of a control program stored in the memory 12 or the storage device 13. Although the CPU 11 reads the control program stored in the memory 12 or the storage device 13 and executes the control program in the present exemplary embodiment, the control program need not be stored in the memory 12 or the storage device 13. The control program may be stored in a computer readable storage medium and provided, instead. For example, the control program may be stored in an optical disc such as a compact disc read-only memory (CD-ROM) or a digital versatile disc read-only memory (DVD-ROM) or a semiconductor memory such as a universal serial bus (USB) memory or a memory card and provided, instead. Alternatively, the control program may be obtained from an external apparatus over a communication network connected to the communication interface 14.

Figure 5:
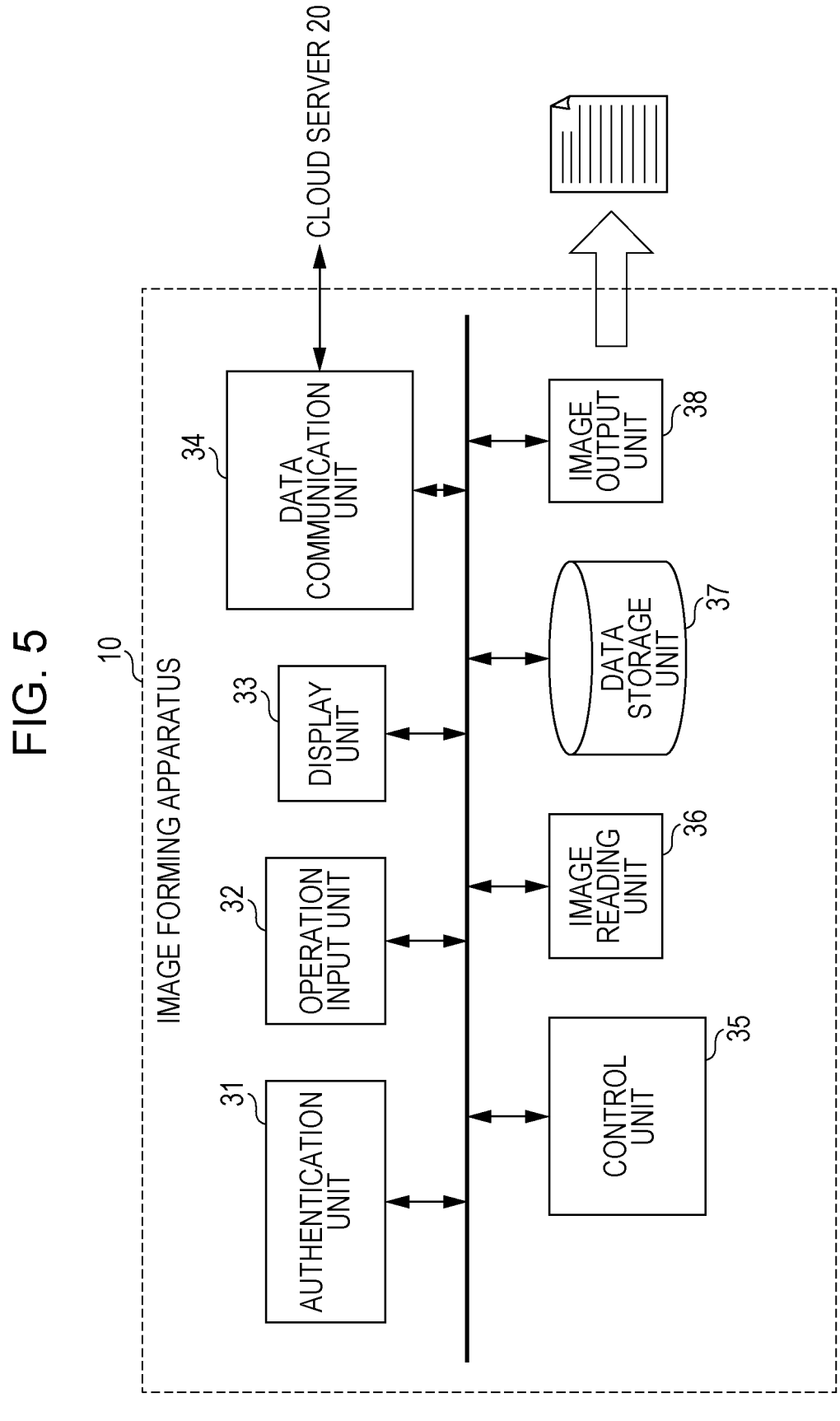
FIG. 5 is a block diagram illustrating the functional configuration of the image forming apparatus according to the exemplary embodiment of the present disclosure.

FIG. 5 is a block diagram illustrating the functional configuration of the image forming apparatus 10 achieved by executing the control program.

As illustrated in FIG. 5, the image forming apparatus 10 according to the present exemplary embodiment includes an authentication unit 31, an operation input unit 32, a display unit 33, a data communication unit 34, a control unit 35, an image reading unit 36, a data storage unit 37, and an image output unit 38.

The authentication unit 31 authenticates, on the basis of an input user identifier (ID), an input password, and the like, for example, a user who desires to use the image forming apparatus 10. The operation input unit 32 receives various pieces of operation information input by the user. The display unit 33 displays various pieces of information for the user under control of the control unit 35.

The data communication unit 34 communicates data with external apparatuses including the cloud server 20. The image output unit 38 outputs images on a recording medium such as sheets of paper under control of the control unit 35.

The image reading unit 36 reads images from set documents under control of the control unit 35. The data storage unit 37 stores various pieces of data, such as printing data, generated by the control unit 35.

The control unit 35 receives a job from the user through an operation performed with the operation input unit 32 and executes the received job by controlling the image reading unit 36, the image output unit 38, the data communication unit 34, and the like on the basis of the received job.

When the control unit 35 executes a job for which the control unit 35 needs to request the cloud server 20, which is an external apparatus, to perform processing and receive a result of the processing from the cloud server 20, the control unit 35 requests, through the data communication unit 34, the cloud server 20 to perform the processing and receives the result of the processing from the cloud server 20 through the data communication unit 34.

If the control unit 35 enters a state of waiting for a result of processing from the cloud server 20 in a case where the control unit 35 executes a job for which the control unit 35 needs to request the cloud server 20 to perform processing and receive a result of the processing from the cloud server 20, the control unit 35 sets identification information for identifying the job that is being executed and enters a state where the control unit 35 can execute another job from another user.

If the user inputs the set identification information, the control unit 35 obtains, from the cloud server 20, the result of the processing for the job identified with the identification information and outputs the result of the processing from the image output unit 38.

In the image forming apparatus 10 according to the present exemplary embodiment, the operation input unit 32 and the display unit 33 together achieve an operation panel of a touch panel type. If the control unit 35 enters a state of waiting for a result of processing from the cloud server 20, the control unit 35 displays, on the operation panel, an operator, such as an operation button, for issuing identification information.

If the user uses the operator, such as the operation button, displayed on the operation panel, the control unit 35 may output code information including the identification information for identifying a job for which the control unit 35 has entered the state of waiting for the result of the processing from the cloud server 20 by printing the code information on a sheet of paper. When the identification information is set in this manner, the user picks up the sheet of paper on which the code information is printed and leaves the image forming apparatus 10. The user then sets, against the image reading unit 36 of the image forming apparatus 10, the sheet of paper on which the code information is printed when the cloud server 20 is expected to have finished the processing. The control unit 35 reads, with the image reading unit 36, an image on the sheet of paper on which the code information is printed and receives the identification information by analyzing the read image.

Alternatively, if the user uses the operation button displayed on the operation panel, the control unit 35 may display, on a display unit 33 of a display apparatus or the like, the code information including the identification information for identifying the job for which the control unit 35 has entered the state of waiting for the result of the processing from the cloud server 20. When the identification information is set in this manner, the user captures and saves an image of the code information displayed on the display unit 33 using a camera of a smartphone or the like and leaves the image forming apparatus 10. The user then displays the code information saved in the smartphone when the cloud server 20 is expected to have finished the processing and sets the code information against the image reading unit 36. The control unit 35 then receives the identification information by reading the image showing the code information using the image reading unit 36 and analyzing the image.

The above-described code information may be, for example, a one-dimensional code such as a barcode or a two-dimensional code such as quick response (QR) code (registered trademark). When the image forming apparatus 10 includes a barcode scanner or a two-dimensional code scanner, the barcode scanner or the two-dimensional code scanner may read code information displayed on a smartphone or the like.

In the above description, a case has been described where the image forming apparatus 10 instructed by the user to start a job and the image forming apparatus 10 instructed by the user to resume the job and receive a result of processing from the cloud server 20 after a user waiting state is established are the same. The image forming apparatus 10 that starts a job and the image forming apparatus 10 that resumes the job and that receives a result of processing from the cloud server 20 after a user waiting state is established, however, may be different from each other, instead.

In this case, if a job identified with input identification information has not been performed by the image forming apparatus 10 including the control unit 35, the control unit 35 identifies a cloud server 20 that has been requested to perform part of processing for the job using address information or the like, which is included in the input identification information, regarding the cloud server 20, obtains a result of the processing from the identified cloud server 20, and outputs the result of the processing.

When this kind of control is performed, identification information includes various pieces of information for reconfiguring a job. If a job identified with input identification information has not been performed by the image forming apparatus 10 including the control unit 35, the control unit 35 obtains a result of processing from the identified cloud server 20 and outputs the result of the processing by reconfiguring the job in the image forming apparatus 10 using the information included in the input identification information.

Next, the operation of the image forming apparatus 10 according to the present exemplary embodiment will be described in detail with reference to the drawings.

In the following description, scanning translation will be described where a document image scanned by the image forming apparatus 10 is transmitted to the cloud server 20 and subjected to OCR and translation and a result of processing is printed and output by the image forming apparatus 10.

Figure 6:
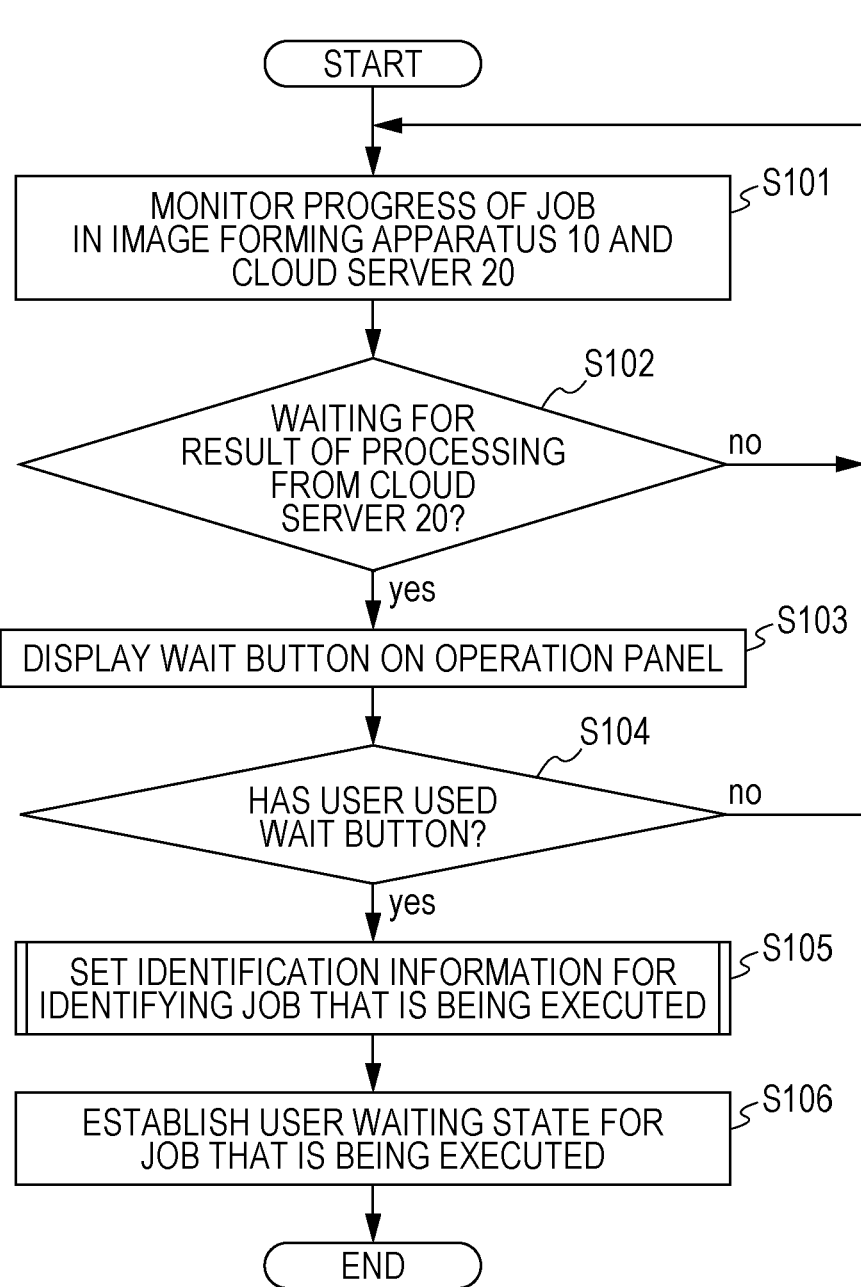
FIG. 6 is a flowchart illustrating an operation performed by the image forming apparatus until a user waiting state is established after a user causes the image forming apparatus to execute a job and the image forming apparatus enters a state of waiting for a result of processing from the cloud server.

First, FIG. 6 is a flowchart illustrating an operation performed by the image forming apparatus 10 until a user waiting state is established after the user instructs the image forming apparatus 10 to execute a job and the image forming apparatus 10 enters a state of waiting for a result of processing from the cloud server 20.

In step S101, the control unit 35 monitors progress of the job in the image forming apparatus 10 and the cloud server 20. When monitoring the progress, the control unit 35 determines, in step S102, whether the image forming apparatus 10 has entered the state of waiting for a result of processing from the cloud server 20. Here, the state of waiting for a result of processing from the cloud server 20 refers to a state where, while executing a certain job, the image forming apparatus 10 cannot proceed to a next step unless the cloud server 20 finishes processing.

If the image forming apparatus 10 determines in step S102 that the image forming apparatus 10 has not entered the state of waiting for a result of processing from the cloud server 20, the control unit 35 causes the operation to return to step S101. If the image forming apparatus 10 determines in step S102 that the image forming apparatus 10 has entered the state of waiting for a result of processing from the cloud server 20, the control unit 35 displays, in step S103, a wait button on the operation panel as an operator for issuing identification information.

Figure 7:
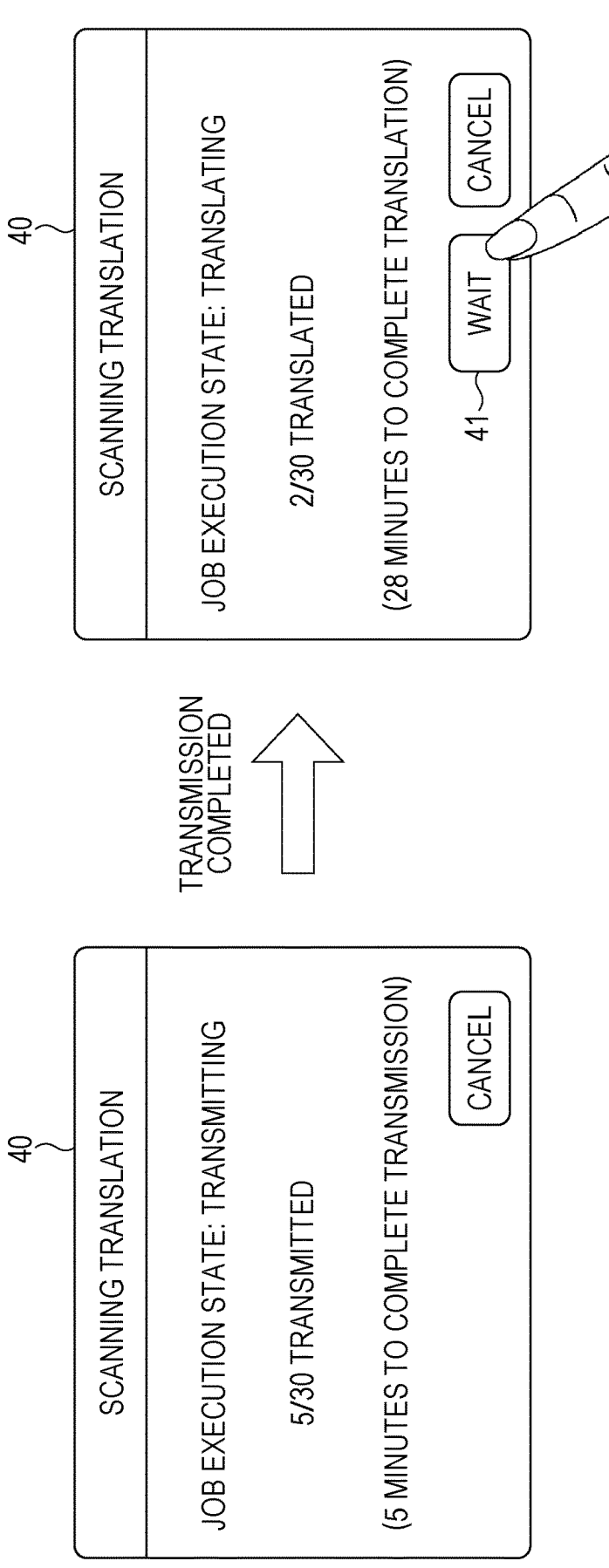
FIG. 7 is a diagram illustrating an example of an operation screen at a time when a wait button is displayed on an operation panel of the image forming apparatus.

FIG. 7 illustrates an example of an operation screen at a time when a wait button 41 is displayed on an operation panel 40 of the image forming apparatus 10.

In FIG. 7, the wait button 41 is not displayed on the operation panel 40 while the image forming apparatus 10 is scanning a document or transmitting the document to the cloud server 20. The wait button 41, however, is displayed on the operation panel 40 when the image forming apparatus 10 has transmitted the scanned document and the cloud server 20 is processing the document. That is, when the wait button 41 is displayed on the operation panel 40, the user understands that he/she can leave the image forming apparatus 10 and enter the user waiting state.

Next, in step S104, the control unit 35 determines whether the user has used the wait button 41. If the control unit 35 determines in step S104 that the user has not used the wait button 41, the operation returns to step S101.

If determining in step S104 that the user has used the wait button 41, the control unit 35 sets, in step S105, identification information for identifying the job that is being executed.

Here, the identification information to be set may be keyword information such as a character string or code information such as a one-dimensional code or a two-dimensional code described above.

Figure 8:
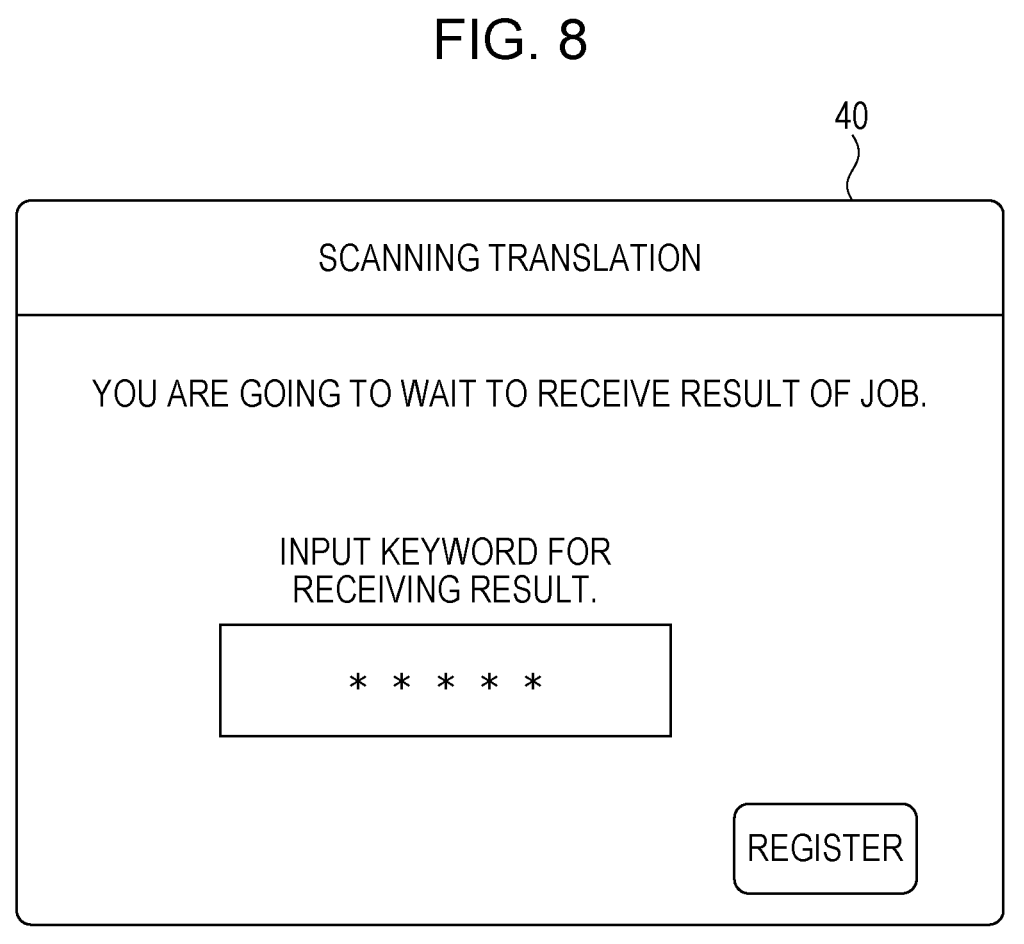

For example, FIG. 8 illustrates an example of a display screen at a time when a character string input by the user is set as a keyword for obtaining a result. In the example of an operation screen illustrated in FIG. 8, a character string input by the user by inputting the character string and pressing a register button is registered as the keyword.

Figure 9:
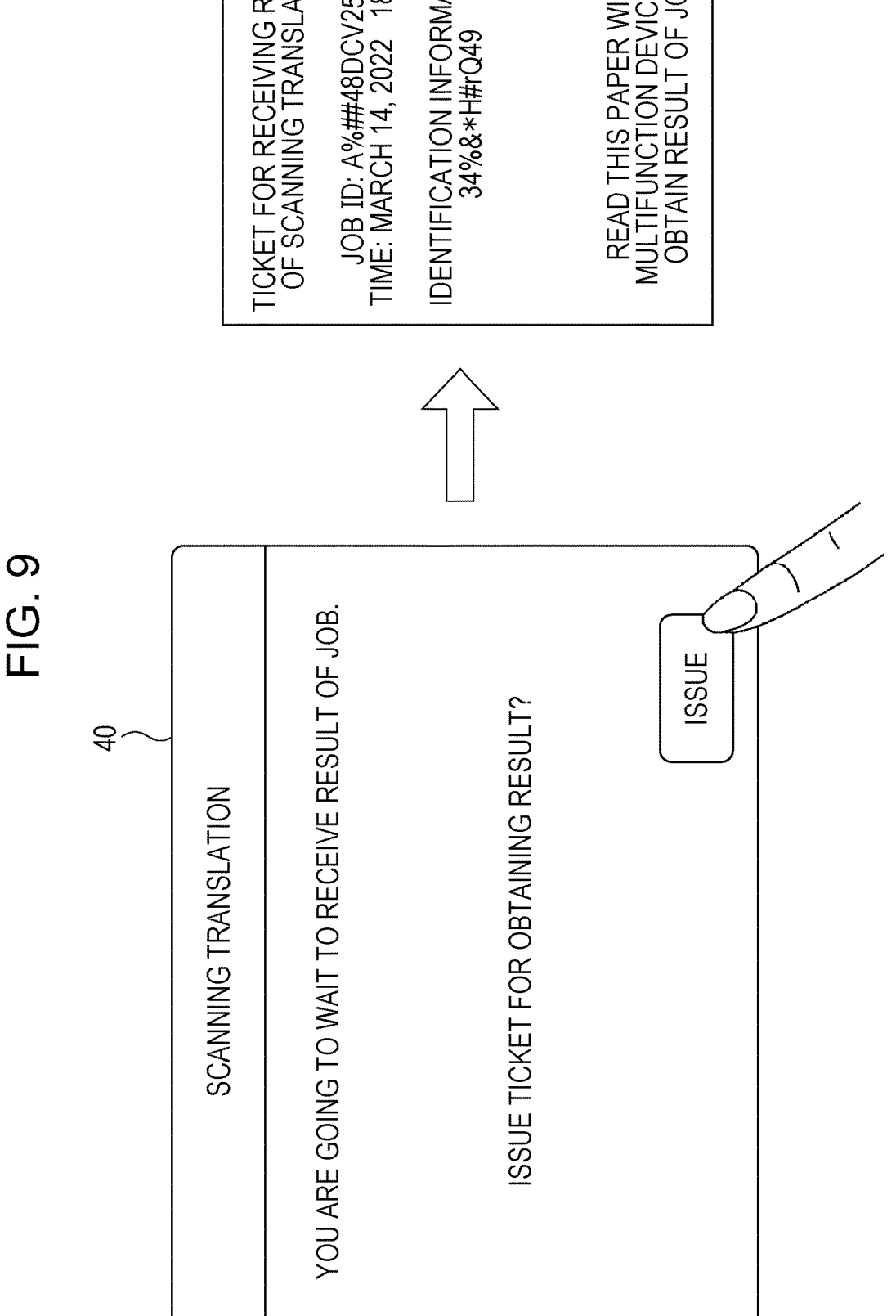
FIG. 9 is a diagram illustrating an example of an operation screen at a time when the user prints and receives a ticket for obtaining a result.

FIG. 9 illustrates an example of an operation screen at a time when the user prints and receives a ticket for obtaining a result. In the example of the operation screen illustrated in FIG. 9, the user presses an issue button for issuing a ticket for obtaining a result to issue a ticket for receiving a result of scanning translation. Although FIG. 9 illustrates a case where a character string set as identification information is printed on the ticket for receiving a result of scanning translation, a one-dimensional code such as a barcode may be printed instead of the character string.

FIG. 10 illustrates an example of an operation screen at a time when the user issues a two-dimensional code for obtaining a result. In the example of the operation screen illustrated in FIG. 10, the user selects "display", "print", or "transmit" as a method for issuing and receiving a two-dimensional code.

Figure 11:
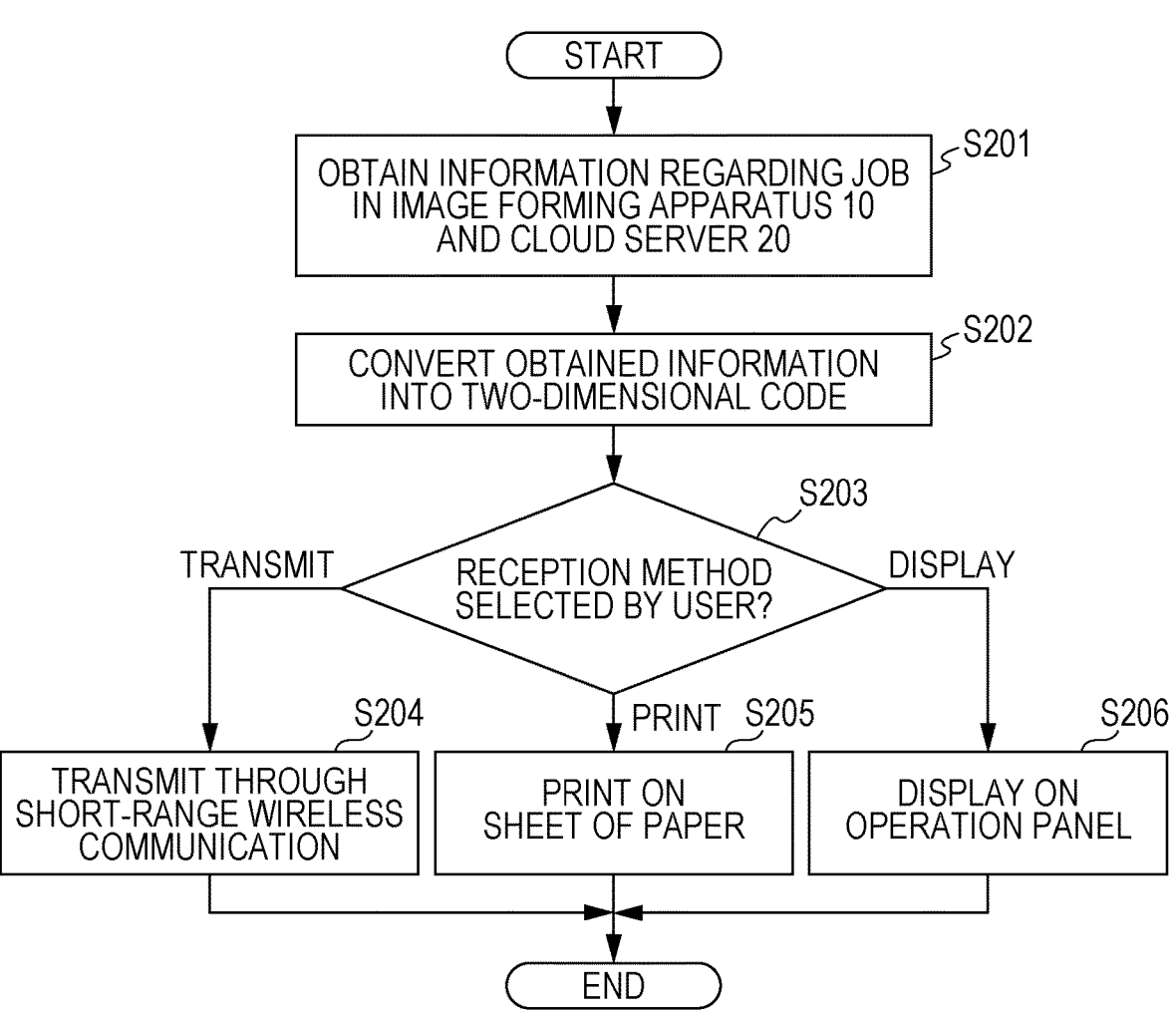
FIG. 11 is a flowchart illustrating an operation performed by the image forming apparatus when a two-dimensional code is set as identification information.

FIG. 11 is a flowchart illustrating an operation performed by the image forming apparatus 10 to set a two-dimensional code as identification information. The flowchart of FIG. 11 illustrates processing corresponding to that in step S105 in the flowchart of FIG. 6.

First, in step S201, the control unit 35 obtains information regarding a job in the image forming apparatus 10 and the cloud server 20. More specifically, the control unit 35 obtains a job ID, which is an identifier of the job that is being executed by the image forming apparatus 10, a user ID and a password of the user who has requested the job, setting information at a time of a start of the job, information regarding a cloud service that uses the job, address information, such as a uniform resource locator (URL), regarding the cloud server 20, user authentication information for the cloud service, and the like.

In step S202, the control unit 35 converts the obtained information into a two-dimensional code.

Next, in step S203, the control unit 35 determines whether the reception method selected by the user is "transmit", "print", or "display".

If determining in step S203 that the reception method selected by the user is "transmit", the control unit 35 transmits, in step S204, the generated two-dimensional code to a smartphone or the like owned by the user through short-range wireless communication such as Bluetooth (registered trademark).

If determining in step S203 that the reception method selected by the user is "print", the control unit 35 outputs, in step S205, the generated two-dimensional code by printing the two-dimensional code on a sheet of paper.

Figure 12:
FIG. 12 is a diagram illustrating an example of a two-dimensional code printed on a sheet of paper.

FIG. 12 illustrates an example of a two-dimensional code printed on a sheet of paper in this manner. In FIG. 12, an image of the two-dimensional code generated in the above manner and a message indicating that the image forming apparatus 10 needs to read the two-dimensional code in order to obtain a result of processing for a job are displayed.

If determining in step S203 that the reception method selected by the user is "display", the control unit 35 displays, in step S206, the generated two-dimensional code on the operation panel and asks the user to capture and save an image of the displayed two-dimensional code.

When a two-dimensional code is issued as identification information, more information can be included in the identification information than when a simple character string, a one-dimensional code, or the like is issued as identification information. As illustrated in FIG. 13, for example, when a ticket for obtaining a result including a character string is issued as identification information, only a job ID and user authentication information for the image forming apparatus 10 are included. When a two-dimensional code is issued as identification information, however, not only a job ID and user authentication information but also various pieces of information such as setting information at a time of a start of a job including resolution and color settings, cloud service information, address information regarding the cloud server 20, such as a URL, and user authentication information for a cloud service can be included in the identification information.

Finally, in step S106, the control unit 35 establishes a user waiting state for the job that is being executed. When the user waiting state is established for the job that is being executed, the control unit 35 causes the image forming apparatus 10 to enter a state where the image forming apparatus 10 can execute another job from another user. That is, in this state, the image forming apparatus 10 can receive another job from another user. The user who has requested the job, therefore, can leave the image forming apparatus 10, and a next user who has been waiting to use the image forming apparatus 10 can use the image forming apparatus 10.

Next, an operation when the user who has been in the user waiting state as a result of the above-described process resumes a job and obtains a result of processing of scanning process will be described.

Figure 14:
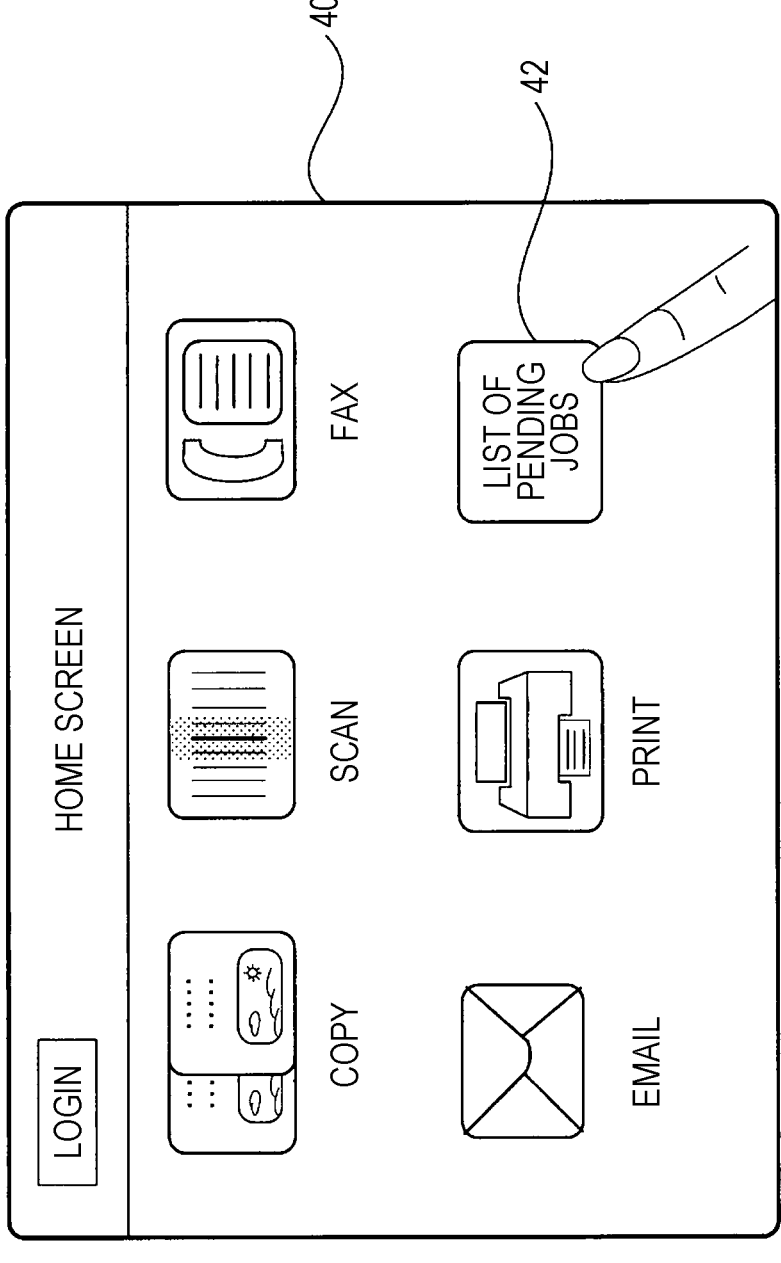
FIG. 14 is a diagram illustrating an example of an operation screen on the operation panel at a time when a job for which the user waiting state has been established is resumed.

FIG. 14 illustrates an example of an operation screen on the operation panel 40 at a time when the user who has left the image forming apparatus 10 and entered the user waiting state instructs, after a while, the image forming apparatus 10 to resume a job. An operation button 42 showing "list of pending jobs" is displayed on the operation panel 40 illustrated in FIG. 14. The user who is attempting to resume a job for which a state of waiting for a result of processing from the cloud server 20 has been established presses the operation button 42 showing "list of pending jobs" illustrated in FIG. 14.

Figure 15:
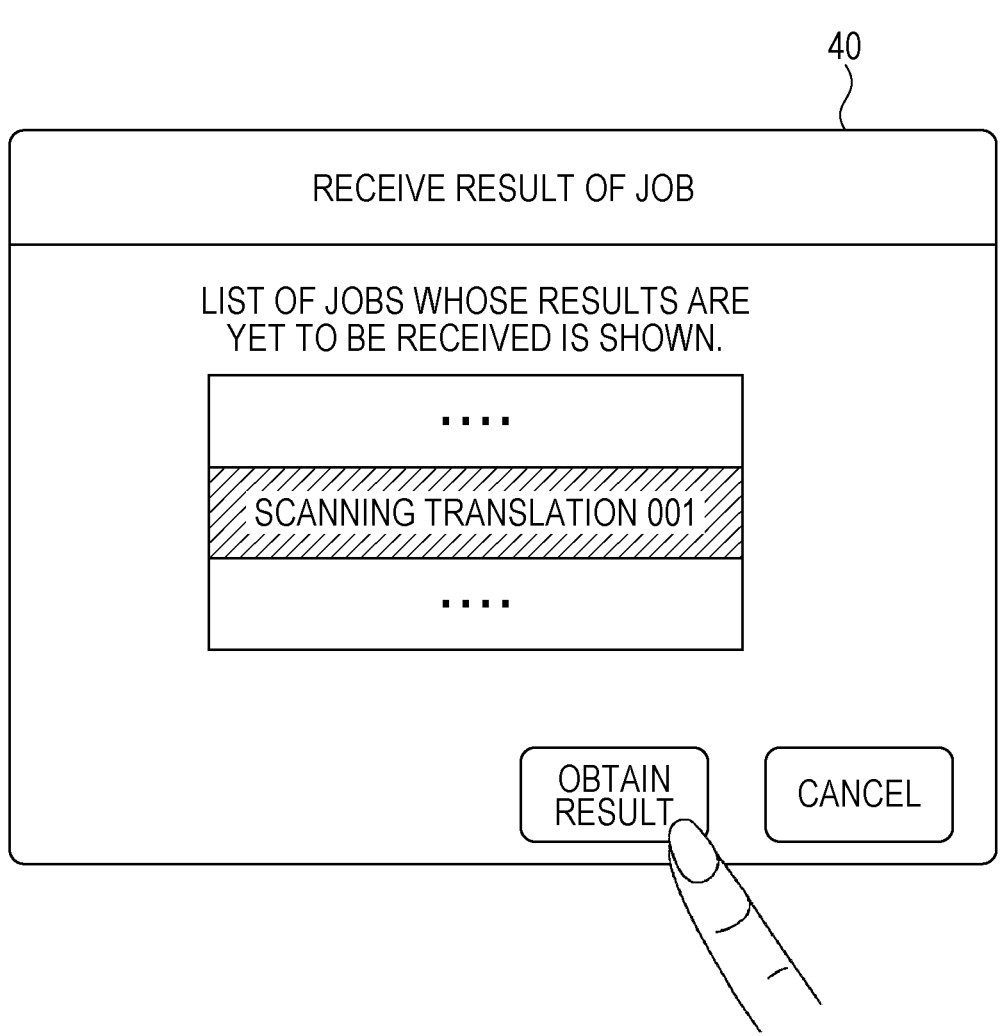
FIG. 15 is a diagram illustrating an example of an operation screen at a time when a list of jobs for which a result of processing is waited for is displayed on the operation panel.

As a result, as illustrated in FIG. 15, a list of jobs for which a result of processing is waited for is displayed on the operation panel 40. The user then selects a job that has been requested thereby from the displayed list and presses an obtain result button. As a result, a process for resuming a selected job is performed.

Figure 16:
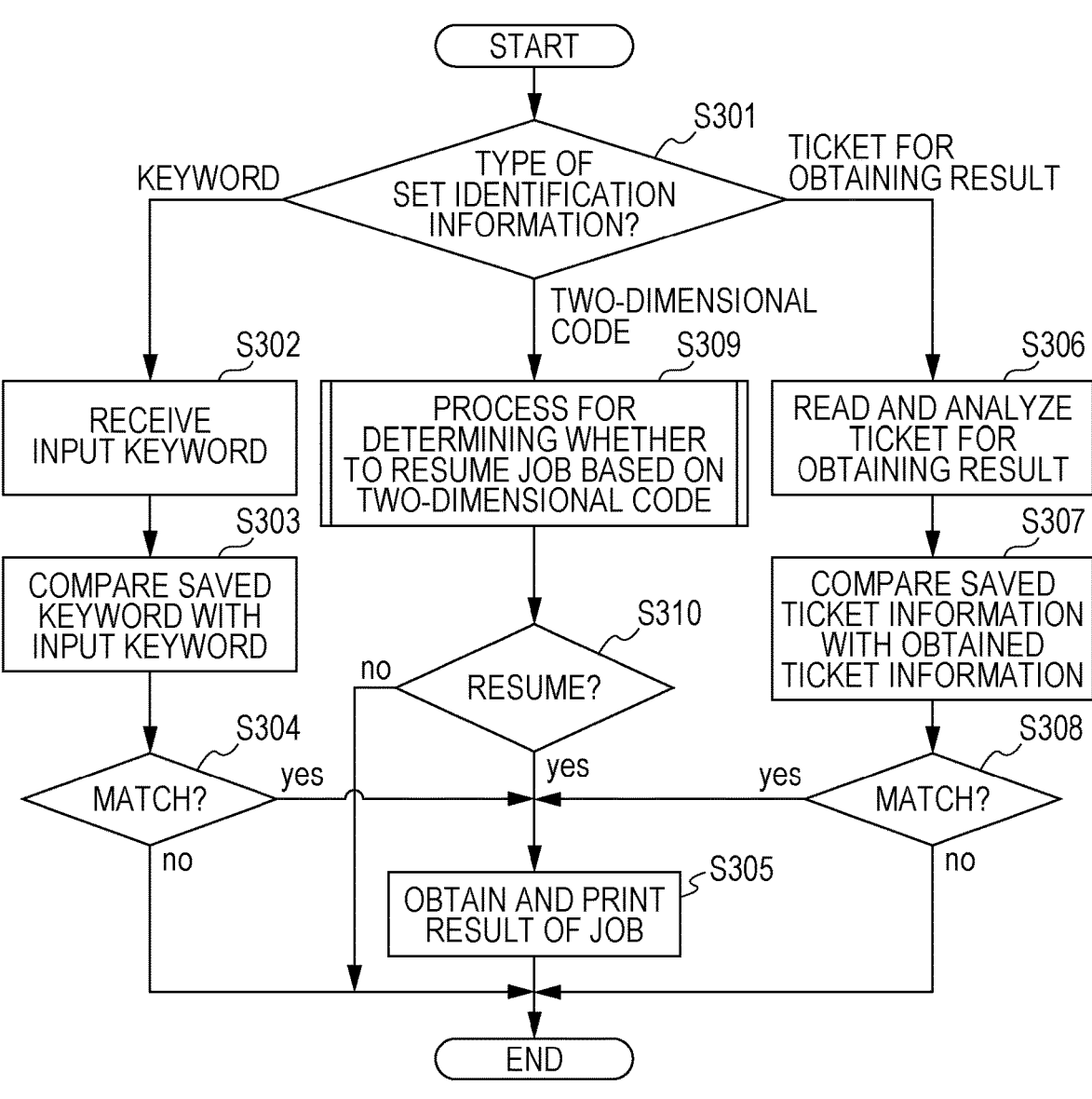
FIG. 16 is a flowchart illustrating an operation performed by the image forming apparatus when a process for resuming a selected job.

FIG. 16 is a flowchart illustrating an operation performed by the image forming apparatus 10 when the process for resuming a selected job is performed.

First, in step S301, the control unit 35 determines whether a type of identification information set when a user waiting state was established for a job was keyword information, two-dimensional code information, or result obtaining ticket information.

If determining in step S301 that the type of identification information set when the user waiting state was established for the job was keyword information, the control unit 35 receives, in step S302, an input of a keyword from the user. FIG. 17 illustrates an example of an operation screen at a time when an input of a keyword is received from the user.

Next, in step S303, the control unit 35 compares saved keyword information and the input keyword information. In step S304, the control unit 35 determines whether the saved keyword information and the input keyword information match.

If determining in step S304 that the saved keyword information and the input keyword information match, the control unit 35 obtains, in step S305, a result of processing for the job from the cloud server 20 and outputs the obtained result of processing by printing the result of processing on a sheet of paper.

If determining in step S304 that the saved keyword information and the input keyword information do not match, the control unit 35 ends the processing.

If determining in step S301 that the type of identification information set when the user waiting state was established for the job was a ticket for obtaining a result, the control unit 35 displays an operation screen illustrated in FIG. 18 and asks the user to read the ticket for obtaining a result with a scanner. In step S306, the control unit 35 reads the ticket for obtaining a result with the image reading unit 36, analyzes the read image, and obtains ticket information regarding the ticket for obtaining a result.

Next, in step S307, the control unit 35 compares saved ticket information and the obtained ticket information. In step S308, the control unit 35 determines whether the saved ticket information and the obtained ticket information match.

If determining in step S308 that the saved ticket information and the obtained ticket information match, the control unit 35 obtains, in step S305, the result of processing for the job from the cloud server 20 and outputs the obtained result of the processing by printing the result of processing on a sheet of paper.

If determining in step S308 that the saved ticket infor-
mation and the obtained ticket information do not match, the
control unit 35 ends the process.

If determining in step S301 that the type of identification
information set when the user waiting state was established
for the job was a two-dimensional code, the control unit 35
performs, in step S309, a process for determining whether to
resume the job on the basis of the two-dimensional code.

If determining in step S310 that a result of the determi-
nation in step S309 as to whether to resume the job indicates
that the job can be resumed, the control unit 35 obtains, in
step S305, the result of processing for the job from the cloud
server 20 and outputs the obtained result of processing by
printing the result of processing on a sheet of paper.

If determining in step S310 that a result of the determi-
nation in step S309 as to whether to resume the job indicates
that the job cannot be resumed, the control unit 35 ends the
process.

Figure 19:
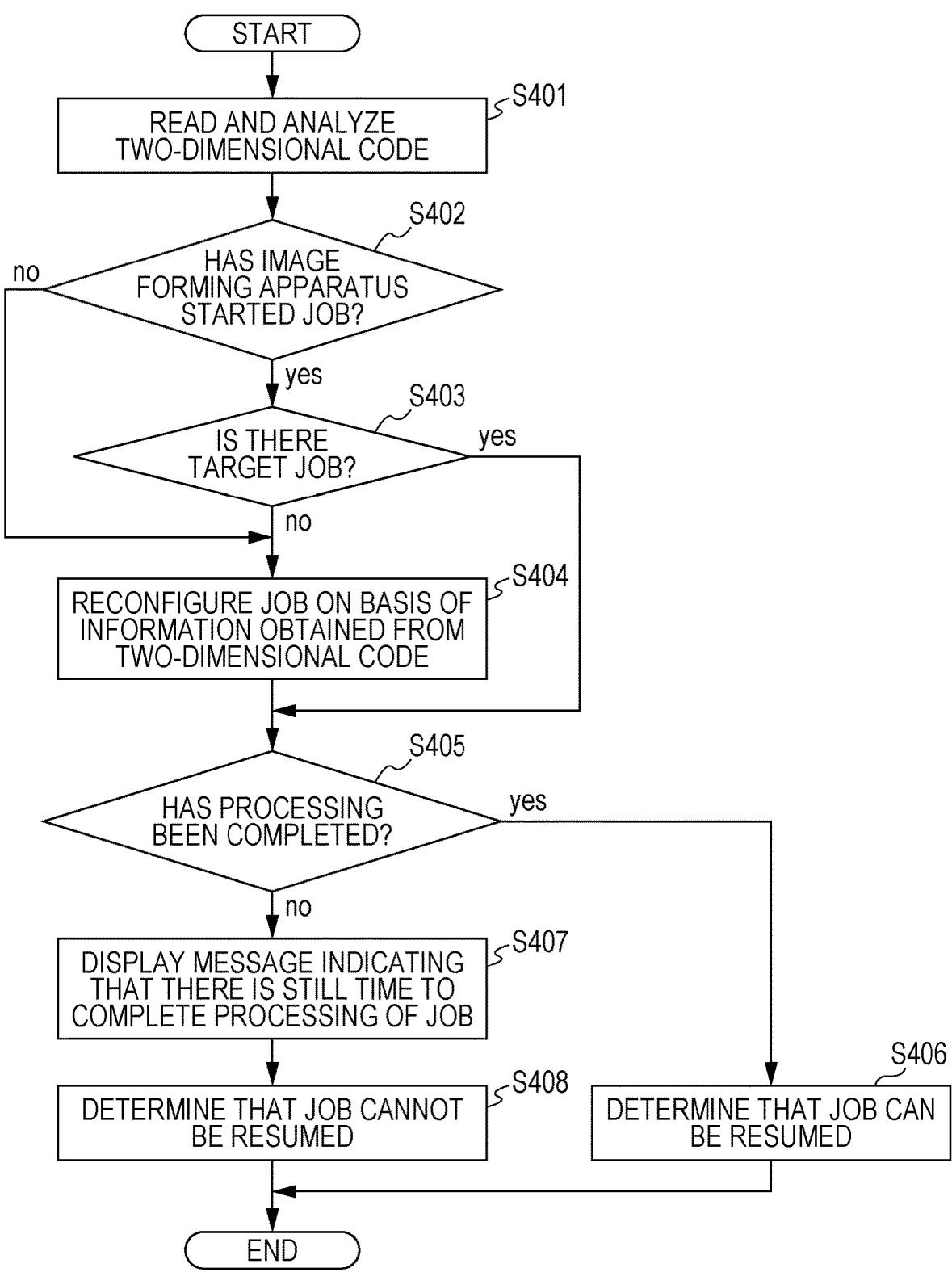
FIG. 19 is a flowchart illustrating details of a process for determining whether to resume a job in step S309 of the flowchart of FIG. 16.

FIG. 19 is a flowchart illustrating details of the process for
determining whether to resume the job in step S309 illus-
trated in the flowchart of FIG. 16.

First, the control unit 35 displays the operation screen
illustrated in FIG. 18 on the operation panel 40 and asks the
user to read a two-dimensional code with the scanner. When
the two-dimensional code has been printed on a sheet of
paper and issued, the sheet of paper is read with the scanner.
When the two-dimensional code has been displayed and an
image of the two-dimensional code has been captured with
a smartphone or the like, or when the two-dimensional code
has been transmitted to a smartphone or the like through
short-range wireless communication, the user causes the
scanner to read the two-dimensional code displayed on the
smartphone or the like. When the image forming apparatus
10 includes a device for reading a two-dimensional code, the
two-dimensional code displayed on the smartphone or the
like is read with the device.

In step S401, the control unit 35 reads the two-dimen-
sional code and performs a process for analyzing an image
of the read two-dimensional code.

Next, in step S402, the control unit 35 determines whether
the image forming apparatus 10 including the control unit 35
has started the job. More specifically, since identification
information regarding an image forming apparatus that has
started the job is included in the two-dimensional code, the
control unit 35 determines whether the image forming
apparatus 10 including the control unit 35 has started the job
by comparing identification information regarding the image
forming apparatus 10 and the identification information
regarding the image forming apparatus obtained by analyz-
ing the two-dimensional code.

If determining in step S402 that the image forming
apparatus 10 including the control unit 35 has started the job,
the control unit 35 determines, in step S403, whether a target
job identified with the two-dimensional code exists in the
image forming apparatus 10.

If determining in step S403 that the target job does not
exist in the image forming apparatus 10, or if determining in
step S402 that the image forming apparatus 10 has not
started the job, the control unit 35 reconfigures, in step S404,
the job on the basis of information obtained from the
two-dimensional code.

After reconfiguring the job in step S404, the control unit
35 determines, in step S405, whether the cloud server 20 has
finished the processing for the target job.

If determining in step S405 that the cloud server 20 has
finished the processing for the target job, the control unit 35
determines in step S406 that the target job can be resumed,
and ends the process.

If determining in step S405 that the cloud server 20 has
not finished the processing for the target job, the control unit
35 displays, in step S407, a message indicating that there is
still time to complete the processing for the job. The control
unit 35 then determines, in step S408, that the target job
cannot be resumed, and ends the process.

As described above, when the user selects a two-dimen-
sional code as identification information at a time when the
user enters the user waiting state, the user can cause an
image forming apparatus different from one that has started
the job to resume the job and receive the result of processing
for the job.

Figure 20:
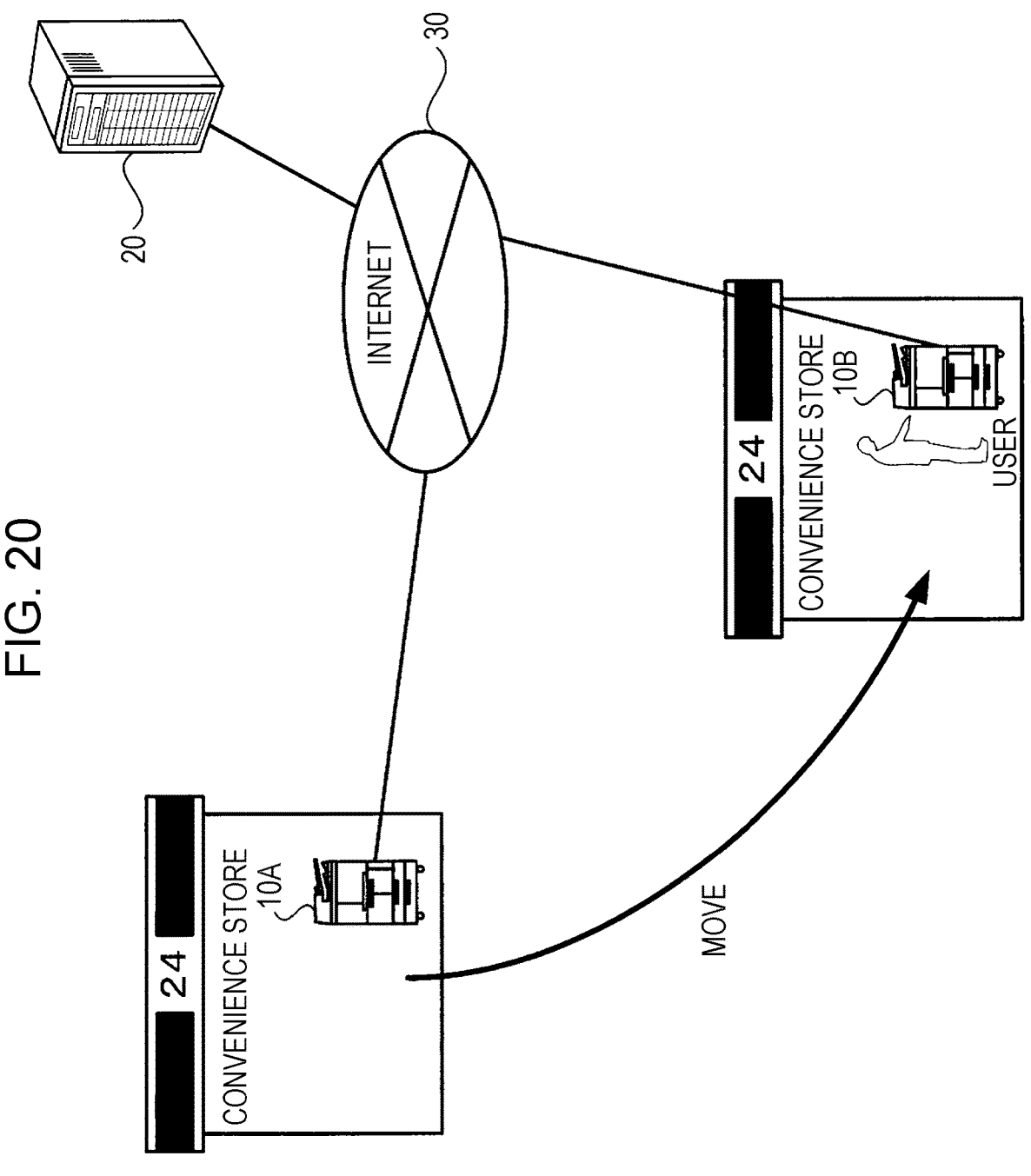
FIG. 20 is a diagram illustrating a case where the user instructed an image forming apparatus to start a job, requested scanning translation, entered a state of waiting for a result of translation from the cloud server, used a wait button, obtained a two-dimensional code, and performed a process for resuming the job using another image forming apparatus.

A case where, as illustrated in FIG. 20, the user instructed
an image forming apparatus 10A at a convenience store to
start a job, requested scanning translation, entered a state of
waiting for a result of translation from the cloud server 20,
used a wait button, and obtained a two-dimensional code, for
example, will be described. It is assumed that the user has
gone to another convenience store in the user waiting state
and performed a process for resuming the job using an image
forming apparatus 10B. When an operation screen illus-
trated in FIG. 21, for example, is displayed on the image
forming apparatus 10B and the two-dimensional code issued
by the image forming apparatus 10A is read, a message,
"Obtain a result of processing of a cloud service provided by
another multifunction device?", is displayed. If the user
presses an operation button, "Obtain", on the operation
screen, the image forming apparatus 10B accesses the cloud
server 20, receives a result of processing for the job, and
outputs the result of the processing through printing.

In the embodiments above, the term "processor" refers to
hardware in a broad sense. Examples of the processor
include general processors (e.g., CPU: Central Processing
Unit) and dedicated processors (e.g., GPU: Graphics Pro-
cessing Unit, ASIC: Application Specific Integrated Circuit,
FPGA: Field Programmable Gate Array, and programmable
logic device).

In the embodiments above, the term "processor" is broad
enough to encompass one processor or plural processors in
collaboration which are located physically apart from each
other but may work cooperatively. The order of operations
of the processor is not limited to one described in the
embodiments above, and may be changed.

The foregoing description of the exemplary embodiments
of the present disclosure has been provided for the purposes
of illustration and description. It is not intended to be
exhaustive or to limit the disclosure to the precise forms
disclosed. Obviously, many modifications and variations
will be apparent to practitioners skilled in the art. The
embodiments were chosen and described in order to best
explain the principles of the disclosure and its practical
applications, thereby enabling others skilled in the art to
understand the disclosure for various embodiments and with
the various modifications as are suited to the particular use
contemplated. It is intended that the scope of the disclosure
be defined by the following claims and their equivalents.

What is claimed is:
1. An image forming apparatus comprising:
a processor configured to:
set, if a state of waiting for a result of processing from
an external apparatus is established in a case where
the processor executes a processing request for
which the processor needs to request an external apparatus to perform the processing and receive the result of the processing from the external apparatus, identification information for identifying the processing request and establish a state where the processor can execute another processing request from another user; and print, in a case where the set identification information is input, the result of the processing for the processing request identified with the input identification information, wherein the processor is configured to identify, if the processing request identified with the input identification information has not been executed by the image forming apparatus, an external apparatus that has requested to perform part of the processing for the processing request using information included in the input identification information, obtain a result of the processing from the identified external apparatus, and print the result of the processing.

2. The image forming apparatus according to claim 1, wherein the processor is configured to display, if the state of waiting for the result of the processing from the external apparatus is established, an operator for issuing the identification information on an operation panel.

3. The image forming apparatus according to claim 2, wherein the processor is configured to:

output, if the user uses the operator displayed on the operation panel, code information including the identification information for identifying the processing request for which the state of waiting for the result of the processing from the external apparatus has been established by printing the code information on a sheet of paper; and read an image on the sheet of paper on which the code information is printed, analyze the image, and receive the identification information.

4. The image forming apparatus according to claim 2, wherein the processor is configured to:

display, if the user uses the operator displayed on the operation panel, code information including the identification information for identifying the processing request for which the state of waiting for the result of the processing from the external apparatus has been established on a display device; and read an image obtained by capturing an image of the code information, analyze the image, and receive the identification information.

5. The image forming apparatus according to in claim 1, wherein the identification information includes information for reconfiguring the processing request, and wherein the processor is configured to reconfigure, if the processing request identified with the input identification information has not been executed by the image forming apparatus, the processing request in the image forming apparatus using the information included in the input identification information, obtain the result of the processing from the identified external apparatus, and print the result of the processing.

6. A non-transitory computer readable medium storing a program causing a processor to execute a process comprising:

setting, if a state of waiting for a result of processing from an external apparatus is established in a case where the processor executes a processing request for which the processor needs to request an external apparatus to perform the processing and receive the result of the processing from the external apparatus, identification information for identifying the processing request and establishing a state where another processing request from another user can be executed; and printing, in a case where the set identification information is input, the result of the processing for the processing request identified with the input identification information, wherein the process includes identifying, if the processing request identified with the input identification information has not been executed by the processor an external apparatus that has requested to perform part of the processing for the processing request using information included in the input identification information, obtaining a result of the processing from the identified external apparatus, and printing the result of the processing.

7. A method executed by a processor comprising:

setting, if a state of waiting for a result of processing from an external apparatus is established in a case where the processor executes a processing request for which the processor needs to request an external apparatus to perform the processing and receive the result of the processing from the external apparatus, identification information for identifying the processing request and establishing a state where another processing request from another user can be executed; and printing, in a case where the set identification information is input, the result of the processing for the processing request identified with the input identification information, wherein the method includes identifying if the processing request identified with the input identification information has not been executed by the processor an external apparatus that has requested to perform part of the processing for the processing request using information included in the input identification information, obtaining a result of the processing from the identified external apparatus, and printing the result of the processing.

* * * * *